United States Patent
Bolz et al.

(10) Patent No.: US 7,812,572 B2
(45) Date of Patent: *Oct. 12, 2010

(54) DEVICE AND METHOD FOR CHARGE EQUALIZATION OF SERIES-CONNECTED INDIVIDUAL CELLS OF AN ENERGY ACCUMULATOR

(75) Inventors: Stephan Bolz, Pfatter (DE); Martin Götzenberger, Ingolstadt (DE); Rainer Knorr, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 101 days.

This patent is subject to a terminal disclaimer.

(21) Appl. No.: 11/909,513

(22) PCT Filed: Mar. 22, 2006

(86) PCT No.: PCT/EP2006/060949

§ 371 (c)(1),
(2), (4) Date: Sep. 24, 2007

(87) PCT Pub. No.: WO2006/100264

PCT Pub. Date: Sep. 28, 2006

(65) Prior Publication Data

US 2008/0211456 A1    Sep. 4, 2008

(30) Foreign Application Priority Data

Mar. 24, 2005    (DE) .................. 10 2005 014 285

(51) Int. Cl.
    *H02J 7/00*    (2006.01)
(52) U.S. Cl. .................. 320/166; 320/167; 320/116; 320/118
(58) Field of Classification Search .............. 320/166, 320/167

See application file for complete search history.

(56) References Cited

U.S. PATENT DOCUMENTS 4,331,911 A    5/1982    Park (Continued)

FOREIGN PATENT DOCUMENTS

DE    44 26 017    2/1996

(Continued)

OTHER PUBLICATIONS

Kutkut et al.: "Charge Equalization for Series Connected to Battery Strings", Industry Applications Society Annual Meeting, 1994, Conference Record of the 1994 IEEE Denver, CO, USA, New York, Oct. 2-6, 1994, pp. 1008-1015.

(Continued)

*Primary Examiner*—Edward Tso
*Assistant Examiner*—Ahmed Omar
(74) *Attorney, Agent, or Firm*—Laurence A. Greenberg; Werner H. Stemer; Ralph E. Locher

(57) ABSTRACT

A device and a method equalize a charge of series-connected individual cells of an energy accumulator with a DC/DC converter. The DC/DC converter draws energy from the energy accumulator or from another power source for charging an intermediate circuit capacitor whose voltage is inverted in a DC/AC converter and the alternating voltage is converted into an intermittent direct current by a rectifier via an AC bus and a coupling element. A switch is placed between the AC bus and each cell thereby enabling the cell to be coupled to the AC bus or disconnected therefrom.

13 Claims, 6 Drawing Sheets

U.S. PATENT DOCUMENTS

| | | | |
|---|---|---|---|
| 5,659,237 A * | 8/1997 | Divan et al. | 320/119 |
| 5,717,579 A | 2/1998 | Sohner | |
| 6,664,762 B2 * | 12/2003 | Kutkut | 320/116 |
| 6,806,685 B2 | 10/2004 | Suzuki et al. | |
| 7,456,610 B2 * | 11/2008 | Yamashita | 320/119 |
| 2003/0038612 A1 | 2/2003 | Kutkut | |
| 2003/0058667 A1 | 3/2003 | Suzuki et al. | |
| 2003/0214267 A1 * | 11/2003 | Long | 320/116 |
| 2004/0037100 A1 | 2/2004 | Orr et al. | |
| 2004/0135546 A1 * | 7/2004 | Chertok et al. | 320/118 |
| 2005/0024028 A1 | 2/2005 | Ying et al. | |

FOREIGN PATENT DOCUMENTS

| | | |
|---|---|---|
| DE | 44 26 017 C2 | 2/1996 |
| DE | 103 12 362 A1 | 9/2004 |
| EP | 0 769 837 A2 | 4/1997 |
| EP | 1 020 973 A2 | 7/2000 |
| EP | 1 296 435 A2 | 3/2003 |
| WO | 02/15363 A2 | 2/2002 |
| WO | WO 02/15363 A2 | 2/2002 |

OTHER PUBLICATIONS

Kutkut et al.: "Dynamic Equalization Techniques for Series Battery Stacks", Telecommuting Energy Conference, 1996; INTELEC '96, 18$^{th}$ International Boston, MA, USA, Oct. 6-10, 1996, pp. 514-521.

* cited by examiner

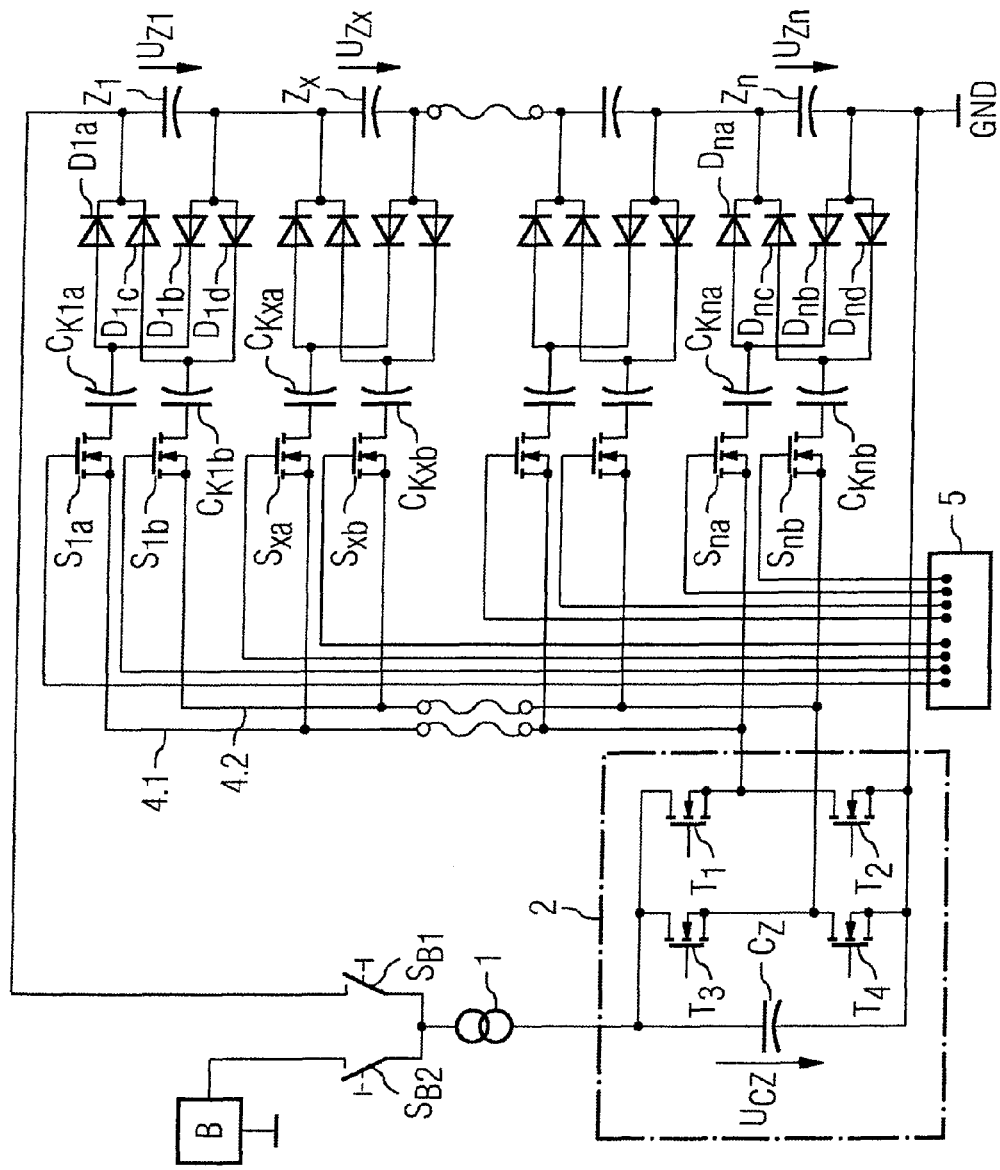
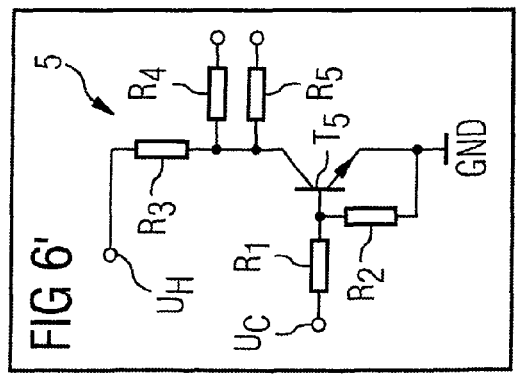
FIG 6
FIG 6'

DEVICE AND METHOD FOR CHARGE EQUALIZATION OF SERIES-CONNECTED INDIVIDUAL CELLS OF AN ENERGY ACCUMULATOR

Device and method for charge equalization of series-connected individual cells of an energy accumulator.

BACKGROUND OF THE INVENTION

Field of the Invention

The invention relates to a device and a method for charge equalization of series-connected individual cells of an energy accumulator, in particular of series-connected capacitors in a double-layer capacitor, such as those used for example in a motor vehicle electrical system.

Double-layer capacitors have been found to be the most logical technical solution for the storage and provision of short-term high power loads in a motor vehicle electrical system, for example for acceleration support (boosting) for the internal combustion machine from an integrated starter-generator functioning as an electric motor or during the conversion of kinetic energy into electrical energy by the integrated starter-generator functioning as a generator during a regenerative braking operation (recuperation).

The maximum voltage of an individual cell in a double-layer capacitor is limited to approximately 2.5V to 3.0V so that for a voltage of, for example, 60V—a typical voltage value for a double-layer capacitor used in a 42V vehicle electrical system—approximately 20 to 26 individual capacitors have to be connected in series to form a capacitor stack.

Due to the different self-discharge rates of the individual cells, over the course of time a charge equilibrium is established in the capacitor stack, which in the end renders the double-layer capacitor unusable if no charge equalization takes place.

If the discharge curve is extrapolated to periods of weeks to months, which are relevant for a motor vehicle, the present problem is obvious. FIG. 1 shows by way of example the spread of the capacitor voltages for a double-layer capacitor (capacitor stack) with 18 cells (capacitors) over time. The spread in FIG. 1 (between maximum and minimum) demonstrates how greatly the self-discharge rates of the individual cells can vary within a capacitor stack over time.

A simple charge equalization, for example caused by a slight overcharging of the capacitor stacks, as with a lead-acid accumulator, is however not possible with a double-layer capacitor.

One possibility known internally within the company is to monitor the voltage of each individual cell by means of separate electronics (operational amplifier and R1/R2 voltage divider) and when a predetermined maximum value $U_{ref}$ is reached or exceeded, to effect a partial discharge by means of a connectable parallel resistance $R_{byp}$ (FIG. 2). The cell is discharged via the parallel resistance $R_{byp}$ and its voltage $U_c$ falls back below the maximum value. When the voltage value reaches a predetermined level below the maximum value, the parallel resistance $R_{byp}$ is turned off.

However, if a circuit of this kind uses little energy in passive state, charge equalization is achieved by charge dissipation (energy loss in the parallel resistance $R_{byp}$). It makes sense to use this variant when a capacitor stack is predominantly operated close to the maximum voltage, for example for supplying emergency generating sets.

However, the concept is restricted in that the charging current entering the capacitor stack must be less than the charge equalization circuit's discharge current, as otherwise it would still be impossible to prevent the overloading of individual capacitors during the charging of the module. In addition, the equalizing system cannot be switched on externally, but is only activated when the predetermined threshold voltage is reached. However, during operation in a motor vehicle, precisely this status is not achieved over a lengthy period. In the long term, charge equalization of this kind results in asymmetry in the capacitor stack. This has been demonstrated by measurements in a test vehicle.

To summarize, a circuit arrangement of this kind has the following drawbacks:

no feedback to a higher-level system management when a cell has exceeded the maximum voltage (for example $U_c > 2.5V$),
 no feedback as to whether the cell voltages are of equal value and therefore the capacitor stack is equalized,
 equalization is only activated when the maximum voltage is exceeded,
 energy is converted into heat by resistances during the equalization process,
 charge equalization of this kind cannot be used with high currents of up to approximately 1 kA, such as those that occur with the above-described vehicle function of recuperation (regenerative braking).

It is known from EP 0 432 639 B2 how, with a multiplicity of series-connected accumulators, charge equalization can be achieved between a weakly charged accumulator and the group of other accumulators, wherein a comparator circuit and a charge circuit (comprising a rectangular function generator) and a diode, a transformer and an interrupter are provided for each individual accumulator in the accumulator stack.

With a device of this kind working as a flyback converter according to the isolating transformer principle (FIG. 3), energy is drawn from the entire stack and then fed back into the accumulator which has discharged to the greatest extent.

This amount of effort may be justified for two or three accumulators but it is definitely too high for a stack of twenty or more accumulators/capacitor cells.

Alternatively, here it is also possible to use another power source—for example an additional battery—which also enables the circuit to be used for slow charging of the capacitor stack—see also DE 102 56 704 B3.

This form of charge equalization can also be performed at any time independently of the attainment of a maximum voltage of the individual capacitor so that it is not possible for a hazardous charge equilibrium to build up in the capacitor stack.

In this case, charges are only displaced. In the long term, no energy is removed from the stack or converted into heat. This makes the concept particularly attractive for motor vehicle applications since, even after lengthy vehicle standstill periods, there must be sufficient energy in the vehicle electrical system in order reliably to guarantee that the engine starts.

However, the drawback with this embodiment is the fact that the secondary side of the flyback transformer requires a very high number of connections. In the case of a capacitor stack with, for example, individual cells, such as is required for the 42V vehicle electrical system, there are 50 connections.

For technical implementation this would necessitate a special, non-commercially available, winding. In addition, any change to the number of cells in the stack would require the adaptation of the transformer. However, this is not expected as, with the technical development of the double-layer capacitor, the permissible maximum voltage is rising from generation to generation and at the given module voltage, correspondingly fewer individual capacitors will be required.

The wiring from the transformer to the capacitor cells is also complex as each contact in the stack has to be connected separately. In the above example, this results in 26 lines as long as the rectified diodes are arranged on the transformer; otherwise, 50 lines are required. In addition, these lines are exposed to high-frequency voltage pulses from the flyback converter's switching operations and require separate EMC suppression measures.

A further aspect is the method for the operation of the flyback converter. Conventional control circuits (switching controller ICs) operate virtually exclusively at a fixed switching rate. The charging of the magnetic store (storage inductance or transformer) takes place in one phase, the discharge, or transmission of power into the output circuit takes place in the other phase of the cycle. This is especially advisable when, in addition to the switched current, there is also a requirement to transmit a DC component (continuous operation). Quite generally, an attempt is made to avoid a switching gap—that is, the period in which the magnetic storage element remains fully discharged—as intensified oscillation tendencies then occur and the storage properties of the magnet core are not used to the optimum extent. The oscillations are caused by the resonant circuit comprising storage inductance and winding capacitance and by the fact that the resonant circuit is excited at the beginning of the switching gap and is not damped by any resistive load.

However, for the application in question here, continuous operation is not possible as, with continuous recharging of the magnetic store, in each case it is not possible to prevent the saturation of the core material before it is fully discharged.

SUMMARY OF THE INVENTION

It is the object of the invention to provide a device with a simplified structure by means of which a controlled operation for charge equalization between the individual series-connected cells can be achieved with little technical effort.

It is also the object of the invention to provide a method for operating this device.

According to the invention, this object is achieved by a device according to the features of claim 1 and a method for operating this device according to the features of claim 11.

In the case of at least two series-connected energy accumulators (cells), the energy required for the equalization of the stored charges is supplied via an alternating voltage bus (AC bus), wherein a selector switch is arranged between the AC bus and each cell, whereby the cells can be electrically connected to the AC bus or electrically disconnected therefrom.

Advantageous developments of the invention can be found in the subclaims.

The connection and electrical insulation of the cells is performed via capacitors or transformers.

The selector switches are preferably embodied as transistors, in particular as MOSFET transistors. These transistors are actuated by a control unit. This actuation is preferably performed as a function of at least one operating parameter of the cells, such as, for example, the capacity or the internal resistance.

The bus system makes the installation simple to perform. The individual cells are supplied via one or two AC bus lines. The circuit only requires a few inexpensive components. These are substantially standard components.

The equalization process can be activated at any time. This activation can be performed by example by a control device, which determines the time of activation on the basis of the operating parameters of a motor vehicle, in particular an internal combustion engine and/or a starter-generator. The recharging of the capacitor can take place via the equalization circuit. In this way, a series connection of empty cells can be recharged from another power source and so, for example, a motor vehicle which has been standing still for a lengthy period can be made capable of starting again.

The entire system is simple to expand and hence is easily scalable.

The circuit arrangement is particularly suitable for integration in the stack of series-connected cells of an energy accumulator and/or in the housing of the individual cells or of the entire energy accumulator.

Double-layer capacitors, also known as super-caps or ultra-caps, are particularly suitable here as energy accumulators.

Examples of embodiments according to the invention are described below with reference to schematic drawings in which:

BRIEF DESCRIPTION OF THE SEVERAL VIEWS OF THE DRAWING

FIG. 6 shows a further example of an embodiment of a charge equalization circuit with inductive coupling elements FIG. 6' shows an example of an embodiment of a control unit with capacitive coupling elements and FIG. 7 further examples of embodiments of a charge equalization circuit.

DESCRIPTION OF THE INVENTION

Figure 1:
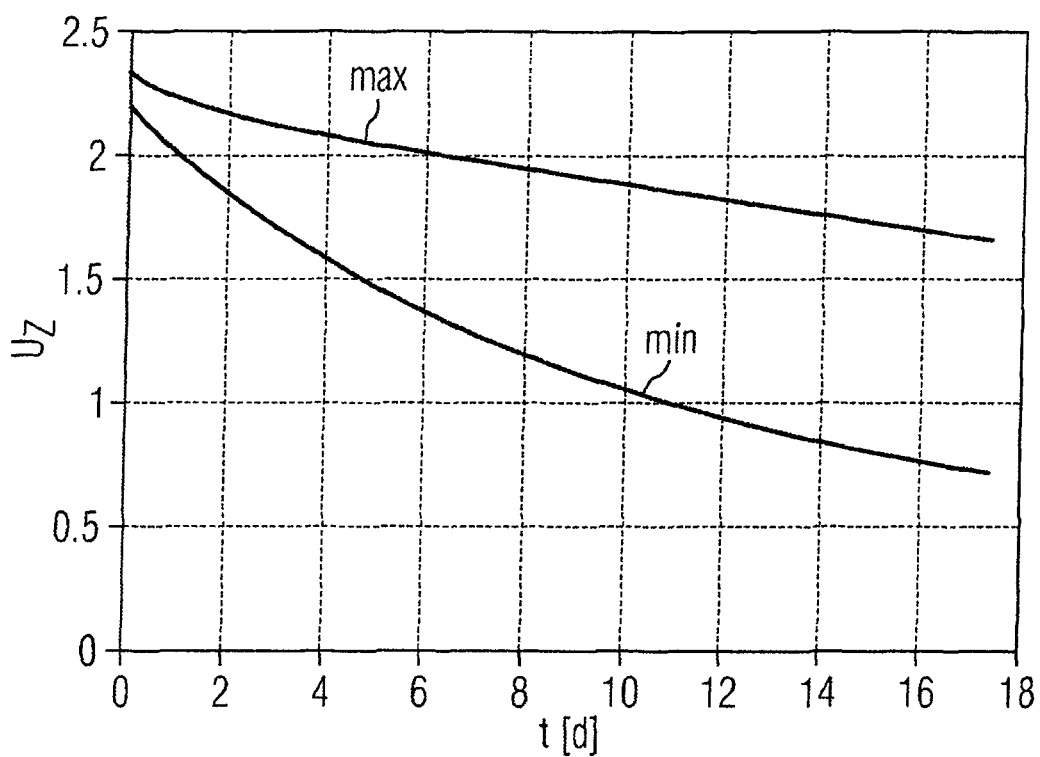
FIG. 1 shows the spread of the capacitor voltages of different cells of a double-layer capacitor over time
Figure 2:
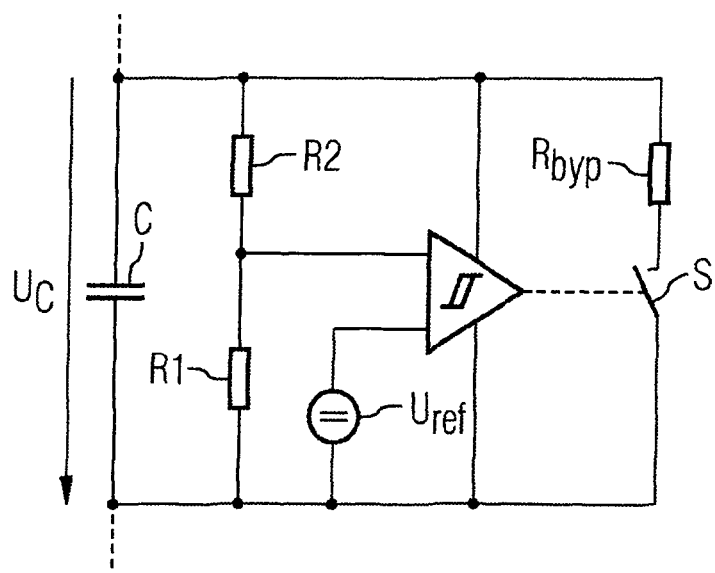
FIG. 2 shows a known circuit arrangement for achieving charge equalization with energy accumulators
Figure 3:
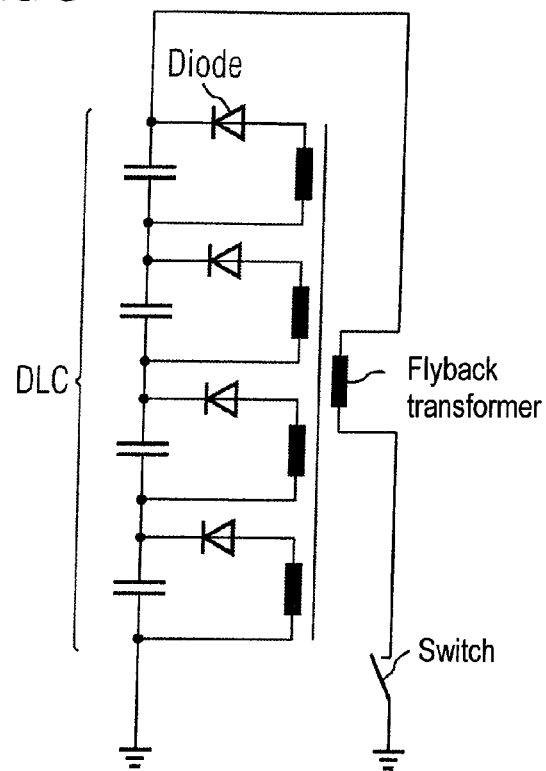
FIG. 3 shows a further known circuit arrangement for achieving charge equalization with energy accumulators

FIGS. 1 to 3 were described above.

Figure 4:
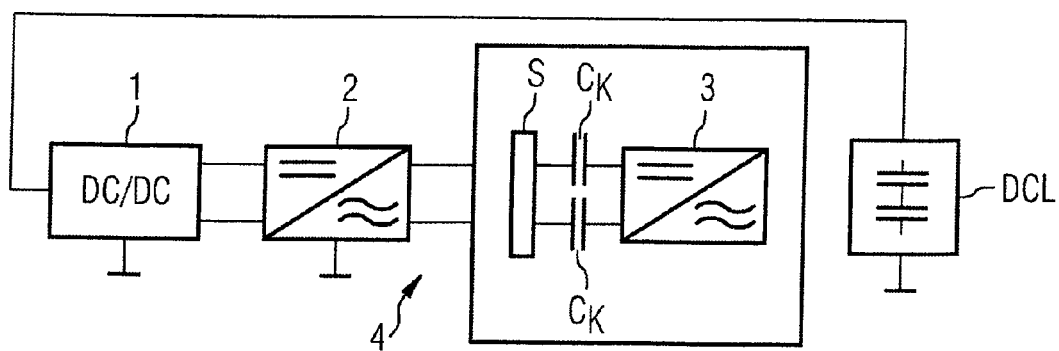
FIG. 4 shows a block diagram of a charge equalization circuit according to the invention

A block diagram of a basic circuit for the charge equalization of cells of an energy accumulator according to the invention is shown in FIG. 4. A first converter 1 generates a direct voltage. This direct voltage is inverted via a second converter 2 with a pulse rate of for example 50 kHz and this alternating voltage is applied to an AC bus 4. Here, a bus designates a system of conductors (cables, copper busbars, etc.).

The series-connected cells $Z_1$ to $Z_n$ of the double-layer capacitor DLC are connected to this bus 4, in each case via a selector switch S and a coupling element, here a coupling capacitor $C_K$ and a rectifier 3. The coupling capacitors $C_K$ are used for electrical isolation and partially recharged by the alternating voltage.

Figure 5:
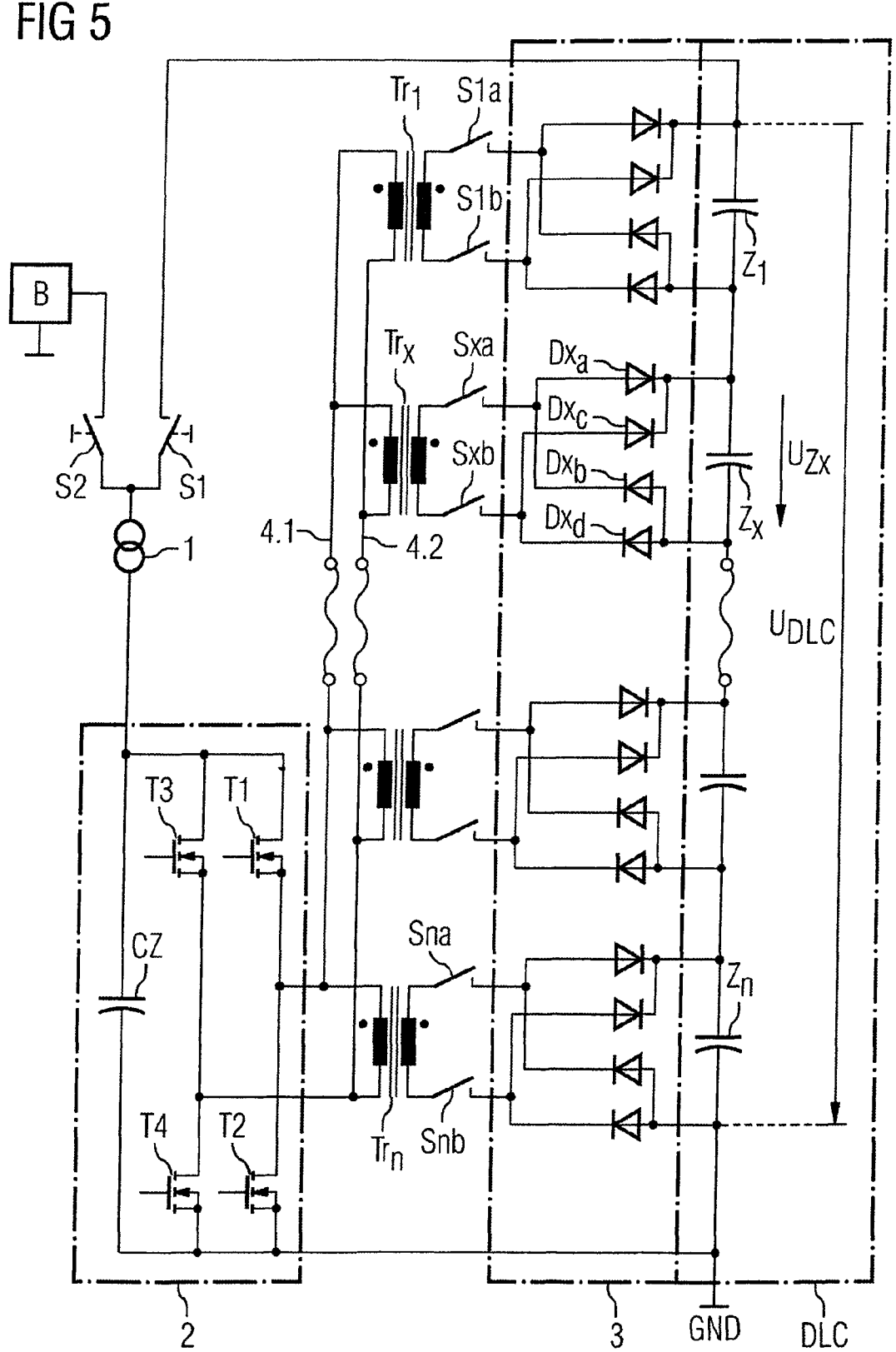
FIG. 5 shows an example of an embodiment of a charge equalization circuit

FIG. 5 shows a first example of an embodiment of a circuit arrangement according to the invention for charge equalization of cells $Z_1$ to $Z_n$ of a double-layer capacitor DLC. The voltage $U_{DLC}$ falling over the series connection of the individual cells $Z_1$ to $Z_n$ of the double-layer capacitor DLC is supplied to a DC/DC voltage converter 1—for example a current-regulated voltage reduction unit—via a first switch SB1. A second switch SB2 can additionally or alternatively be used to connect a power source, for example an accumulator B, to the DC/DC voltage converter 1.

The DC/DC converter 1 is electrically connected to the input of a DC/AC converter 2 comprising an intermediate circuit capacitor $C_Z$ and a full-bridge circuit with two half-bridges comprising a first and second transistor T1-T2 or third and fourth transistor T3-T4, the outputs of which, the interconnection points of transistors T1-T2 or T3-T4, are each connected to a bus line 4.1, 4.2. Each bus line is supplied with energy via the half-bridge assigned to it.

Each cell $Z_1$ to $Z_n$ is
a) assigned a coupling transformer $Tr_1$ to $Tr_n$, the primary winding of which lies between the two bus lines 4.1 and 4.2 and
b) assigned a series connection of a selector switch $S_{1a}$ to $S_{na}$ and $S_{1b}$ to $S_{1b}$ and a rectifier circuit 3, which lies between the secondary winding of the assigned coupling transformer and the actual cell.

Using the example of a cell $Z_x$ (x=1 to n), this means:
the first connection of the secondary winding of the coupling transformer $Tr_x$ is connected via a selector switch $S_{Xa}$ and a diode $D_{xa}$ conducting toward the cell $Z_x$ to the positive connection of the cell $Z_x$ and via the selector switch $S_{xa}$ and via a diode $D_{xb}$ conducting away from the cell to the negative connection of the cell $Z_x$ and
the second connection of the secondary winding of the coupling transformer $Tr_X$ is connected via a selector switch $S_{Xb}$ and a diode $D_{xc}$ conducting toward the cell $Z_X$ to the positive connection of the cell $Z_X$ and via the selector switch $S_{Xb}$ and a diode $D_{xd}$ conducting away from cell with the negative connection of the cell $Z_X$.

The four rectified diodes $D_{xa}$ to $D_{xd}$ therefore each form a Grätz rectifier.

The DC/AC converter 2 functions with a pulse rate of, for example, 50 kHz. Since coupling transformers with limited controllability are used subsequently, it is necessary to ensure that a DC-free signal goes to the AC bus.

On the actuation of the AC bus lines 4.1 and 4.2, an alternative voltage appears on the secondary side of the coupling transformers. If this alternating voltage reaches the sum of the cell voltage $U_{zx}$ of the cell $Z_x$, whose actuation switches $S_{xa}$ and $S_{xb}$ are closed and which in the selected group has the lowest cell voltage, plus two diode flow voltages, it is inverted by means of the subsequent rectifier circuit 3 to form a pulsating direct voltage and results in a current flow at this cell. Depending upon the actuation state of the selector switches $S_{xa}$ and $S_{xb}$ and their cell voltage, all other cells are not influenced by this or, depending upon the cell voltage, only influenced to a minimum degree.

The energy, with which the cell $Z_x$, which is connected to the AC bus and has the lowest cell voltage $U_{zx}$ in this group, is charged, comes from the intermediate circuit capacitor $C_z$, which automatically sets itself to the required voltage due to this loading on the one hand and due to the constant recharging on the other.

Transformers with low spread and diodes with a low conducting-state voltage have been found to be particularly suitable.

The two half-bridges of the DC/AC converter 2 actuated by a rectangular signal work in phase opposition, i.e. if the transistors T1 and T4 are conductive in the first phase, the transistors T2 and T3 are non-conductive; the opposite is true in the second phase: here, the transistors T2 and T3 are conductive while the transistors T1 and T4 are non-conductive.

The DC/DC converter 1 draws the energy from the entire capacitor stack comprising the series-connected individual cells $Z_x$, that is the double-layer capacitor DLC. Optionally or additionally, energy can be supplied to the system via an additional switch SB2.

In the first phase, a current flows from the intermediate circuit capacitor $C_z$ via transistor T1 and bus line 4.1 into the primary winding of the coupling transformer $Tr_X$ and back via the bus line 4.2 and transistor T4 to the intermediate circuit capacitor $C_z$.

In the second phase, a current flows from the intermediate circuit capacitor $C_z$ via transistor T3 and bus line 4.2 into the primary winding of the coupling transformer $Tr_X$ (now in the reverse direction) and back via the bus line 4.1 and transistor T2 to the intermediate circuit capacitor $C_z$.

The actuation of the primary windings causes the voltage at the secondary windings of all coupling transformers $Tr_1$ to $Tr_n$, for which the secondary side selector switches $S_{Xa}$ and $S_{Xb}$ are closed, to rise until it corresponds to the cell voltage of the least-charged cell $Z_X$ plus two diode voltages from the group of the cells Z selected via the selector switches.

In the first phase, this voltage causes a current flow from the first connection of the secondary winding through the selector switch $S_{xa}$, the diode $D_{xa}$, the least-charged cell $Z_x$ and the diode $D_{xd}$ back via the selector switch $S_{xb}$ to the second connection of the secondary winding, whereby the cell $Z_x$ is charged.

In the second phase, the now-reversed voltage with the same value at the secondary winding of the coupling transformer $Tr_x$ causes a current flow from the second connection of the secondary winding through the selector switch $S_{xb}$, the diode $D_{xc}$, the cell $Z_x$ and the diode $D_{xb}$ via the selector switch $S_{xa}$ back to the first connection of the secondary winding, whereby the cell $Z_x$ is also charged.

This achieves a very efficient recharging of the cell $Z_x$ selected via the selector switches $S_{xa}$ and $S_{xb}$ or the most highly discharged cell $Z_x$—if a group of cells is selected.

This cell is charged until the selector switches $S_{xa}$ and/or $S_{xb}$ are opened or the cell voltage of the cell $Z_x$ reaches the next higher cell voltage of another selected cell. The pulsating direct current then flows through these two cells etc. until all cells have the same cell voltage.

The selector switches $S_{1a}$ to $S_{1n}$ and $S_{1b}$ to $S_{1n}$ are shown schematically in FIG. 5; these selector switches can be any kind of circuit breakers, such as, for example, MOSFET transistors, IGBTs etc. In this example of an embodiment, these selector switches $S_{1a}$ to $S_{1n}$ and $S_{1b}$ to $S_{1n}$ are triggered by a control unit 5 (not shown here) (see FIG. 6' in this regard).

FIG. 6 shows a further example of an embodiment of the circuit arrangement according to the invention with a full bridge and (Graetz) rectifier in a two-phase variant. Here, once again, the cell $Z_x$ is the one with the lowest cell voltage $U_{zx}$. In this example of an embodiment, the coupling element is designed as coupling capacitor $C_K$.

Here, parts with identical functions have the same reference numbers as in FIG. 5.

The circuit of the example of an embodiment with two phases functions in a similar way to the circuit of the above described example of an embodiment shown in FIG. 5 with one half-bridge and one phase. However, here there are certain advantages which offset the extra cost.

The example of an embodiment according to FIG. 6 comprises as a DC/AC voltage converter 2 a full-bridge circuit with two half-bridges comprising a first and second transistor T1-T2 or third and fourth transistor T3-T4 each connected to a bus-line 4.1, 4.2. Each bus line is supplied with energy via the half-bridge assigned to it.

The bus line 4.1 is connected via a respective selector switch $S_{1a}$ to $S_{1n}$, a respective coupling capacitor $C_{K1a}$ to $C_{Kna}$ and a rectifier circuit comprising two respective diodes $D_{1a}$, $D_{1b}$ to $D_{na}$, $D_{nb}$ to the series-connected cells $Z_1$ to $Z_n$.

The bus line 4.2 is connected via a respective selector switch $S_{1a}$ to $S_{1n}$, a coupling capacitor $C_{K1b}$ to $C_{Knb}$ and a rectifier circuit 3 comprising two respective diodes $D_{1c}$, $D_{1d}$ to $D_{nc}$, $D_{nd}$ to the series-connected cells $Z_1$ to $Z_n$.

Using the example of the cell $Z_x$, this means: the bus line 4.1 connected to the half-bridge T1-T2 is connected via the selector switch $S_{xa}$, the coupling capacitor $C_{KXa}$ on the one hand via the diode $D_{xa}$, which conducts toward the cell, to the positive connection of the cell $Z_x$ and on the other hand via the diode $D_{xb}$, which conducts toward the coupling capacitor, to the negative connection of the cell $Z_x$.

In addition, the bus line 4.2 connected to the half-bridge T3-T4 is connected via the selector switch $S_{xb}$, the coupling capacitor $C_{Kxb}$ on the one hand via the diode $D_{xc}$, which conducts toward the cell, to the positive connection of the cell $Z_x$ and on the other hand via the diode $D_{xd}$, which conducts toward the coupling capacitor, to the negative connection of the cell $Z_X$.

The two rectifiers $D_{xa}$, $D_{xb}$ and $D_{xc}$, $D_{xd}$ therefore work in parallel to the cell $Z_x$. The circuit for all other cells $Z_1$ to $Z_{x-1}$ and $Z_{x-1}$ to $Z_n$ has a similar appearance.

A substantial advantage with two phases is hereby the fact that there is no alternating current through actually non-participating cells, which are not currently charged, that is all cells with a positive connection with a potential lower than the reference potential GND but with higher cell voltages $U_Z$ than the cell $Z_X$ (in this case, through the cells $Z_{x+1}$ to $Z_n$)

Through the selector switches $S_{1a}$ to $S_{na}$ and $S_{1b}$ to $S_{nb}$, it is possible to charge either only one individual cell $Z_X$ or also a group of cells Z.

In this example of an embodiment, the two half-bridges work in phase opposition, i.e. when the transistors T1 and T4 are conductive in the first phase, the transistors T2 and T3 are non-conductive; the reverse case is true in the second phase: here, the transistors T2 and T3 are conductive, while the transistors T1 and T4 are non-conductive.

In the first phase, a current flows from the intermediate circuit capacitor $C_Z$ via transistor T1 into the bus 4.1, via selector switch $S_{1a}$, coupling capacitor $C_{Kxa}$ and diode $D_{xa}$ through the cell $Z_x$ and back via diode $D_{xd}$, coupling capacitor $C_{Kxb}$, selector switch $S_{1b}$, the bus 4.2 and transistor T4 to the intermediate circuit capacitor $C_Z$.

In the second phase, a current flows from the intermediate circuit capacitor $C_Z$ via transistor T3 into the bus 4.2, via selector switch $S_{1b}$, coupling capacitor $C_{Kxb}$ and diode $D_{xc}$ though the cell $Z_X$ and back via diode $D_{Xb}$, coupling capacitor $C_{Kxa}$, selector switch $S_{1a}$, the bus 4.1 and transistor $T_2$ to the intermediate circuit capacitor $C_z$.

The recharge current of the one coupling capacitor $C_{Kxa}$ and the discharge current of the other coupling capacitor $C_{Kxb}$ balance each other out.

The voltage reduction unit 1 draws the energy from the entire capacitor stack comprising the series-connected individual cells Z, i.e. the double-layer capacitor DLC. Optionally, energy can be supplied to the system via an additional switch SB2.

The voltage at the respective AC bus rises until it corresponds to the lowest cell voltage plus two diode voltages. This achieves a very efficient recharging of the cells selected via the selector switches $S_{1a}$ to $S_{na}$ and $S_{1b}$ to $S_{nb}$ or the most highly charged cell in a group selected by the selector switches $S_{1a}$ to $S_{na}$ and $S_{1b}$ to $S_{nb}$.

No complex, expensive individual components are required in the entire circuit.

The structure of the AC bus 4.1 and 4.2 means the system is simple to expand. It is simple to connect additional energy accumulators $Z_{n+1}$ to the bus or remove superfluous ones therefrom.

A control unit 5 actuates the gate connections of the selector switches $S_{1a}$ to $S_{na}$ and $S_{1b}$ to $S_{nb}$. Actuation can, for example, take place via a gate driver as shown in FIG. 6'.

In the control unit 5, a control voltage $U_c$ is applied to the base of a transistor $T_5$ via a resistance $R_1$. Here, the transistor $T_5$ is an npn-bipolar transistor.

A further resistance $R_2$ connects the base to the emitter of the transistor $T_5$. The base is further connected to ground GND. The collector of the transistor $T_5$ is connected via a resistance $R_3$ to a voltage source with a voltage $U_H$, for example 15 V. The emitter is further connected via a respective resistance $R_2$ or $R_5$ with the respective gate of the selector switches $S_{xa}$ or $S_{xb}$. If the base of the transistor $T_5$ is actuated, this is conductively switched and the selector switches $S_{xa}$ and $S_{xb}$ are actuated and thereby also conductively switched. Each cell Z or—if groups of cells are to be selected—each of these groups comprises a control unit 5.

Figure 7A:
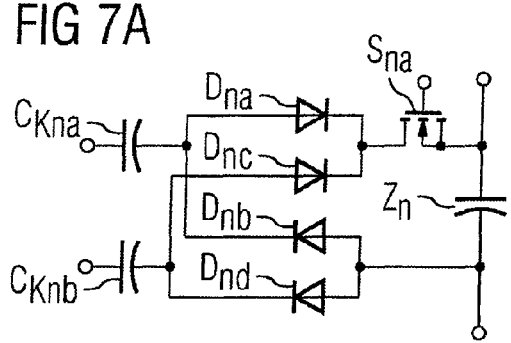
Figure 7B:
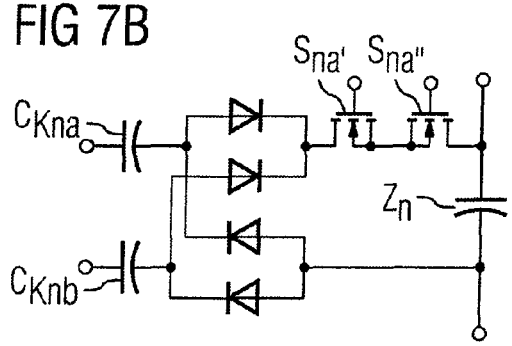
Figure 7C:
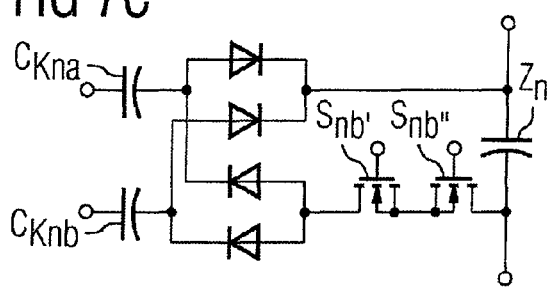
Figure 7D:
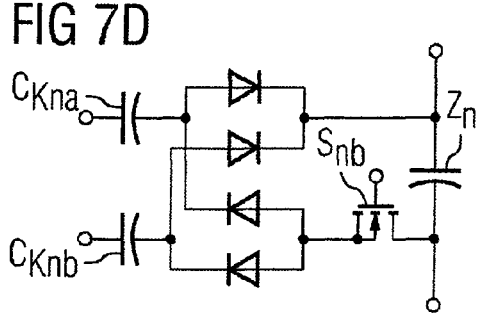

FIGS. 7a) to i) show different examples of embodiments of a charge equalization circuit in which the arrangement of the selector switches is varied.

Here, functionally identical parts have the same reference numbers as in FIG. 6.

Figure 7E:
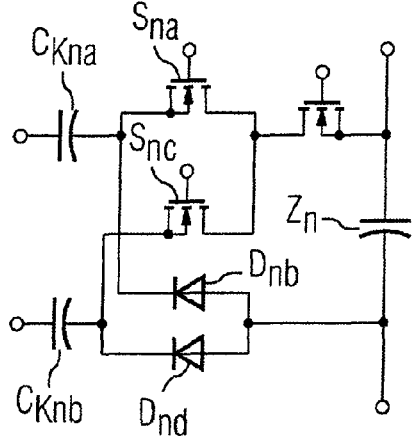
Figure 7F:
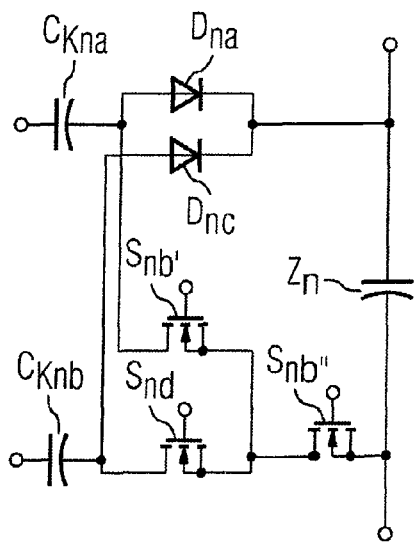
Figure 7G:
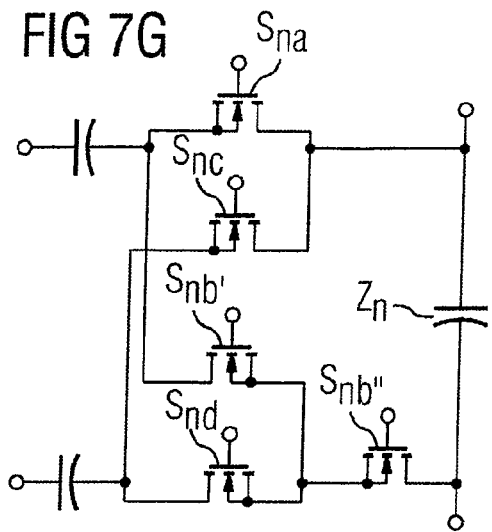
Figure 7H:
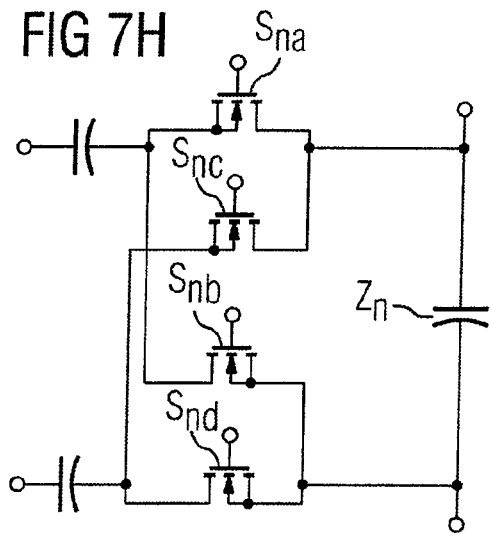
Figure 7I:
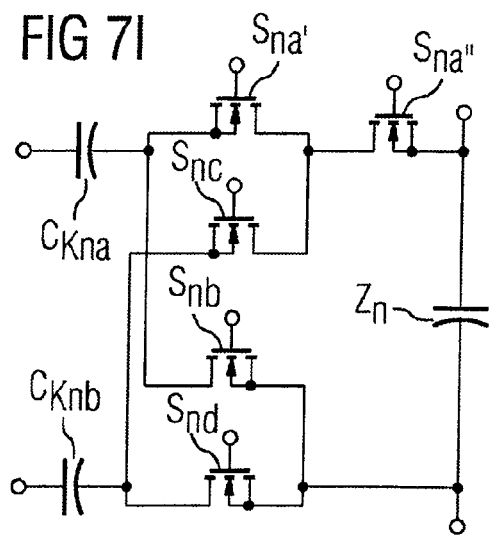

In addition, all diodes $D_n$, or a part of the diodes $D_n$, can be implemented with the aid of the drain-source diodes of the MOSFET-selector switches $S_{na}$ to $S_{nd}$ (see FIGS. 7e) to i))

The charge equalization circuits described here can be used to perform the following procedure:
 measurement of the cell voltages $U_z$ of the individual cells Z,
 actuation of the selector switches $S_{xa}$, $S_{xb}$ of the $Z_x$ with the lowest cell voltage,
 charging of this cell to a threshold voltage, which is predetermined or determined on the basis of operating parameters, in particular 2.5 V.

The measurement of the cell voltage can, for example, be performed using the method described in DE 103 47 110 B3. The entire content of DE 103 47 110 B3 is hereby included in the scope of this application.

With charge equalization of a plurality of selected cells Z, the selectivity is inter alia determined by the coupling capacitors $C_K$ or by the coupling transformers Tr. However, since here only selected cells are charged, here the effective selectivity is only established by the precision of the cell voltage measurement.

If a short circuit occurs at a cell Z, with a charge equalization circuit without a selection option, this would take up the entire charging current since it has the lowest voltage. Here, however, this cell Z can be disconnected from the AC bus via the selector switch S. Following this, charging of the other cells Z can be equalized.

The charge equalization circuit can also be protected against polarity reversal by the choice of a suitable arrangement and configuration of the selector switches (see FIG. 7).

In addition, depending upon the total voltage $U_{DLC}$ of the double-layer capacitor DLC, cells Z can be excluded from the charge equalization on the basis of their operating parameters, in particular their capacity.

In addition, cells Z with a higher leakage current can be excluded from the charge equalization by disconnection from the AC bus. In this way, the total energy consumption of the arrangement can be reduced. If, due to the cell voltage $U_{zx}$, there is a risk of polarity reversal of the cell $Z_x$ during a subsequent discharging of the double-layer capacitor, this cell $Z_x$ can be charged to a predetermined minimum voltage by a controlled selection.

The reduction of the total energy consumption and the maintenance of a minimum voltage is particularly advantageous in the case of lengthy immobilization times.

The charge equalization circuit can also be used for equalizing the charge of other energy accumulators, for example of series-connected accumulators.

These circuit arrangements (DLC, rectified diodes, coupling capacitors, selector switches and bus line(s)) can be integrated both in housings surrounding the individual cells or in a common housing. This enables the assembly of a compact unit comprising only three or four connections.

Alternatively, it is also possible for a circuit arrangement according to FIG. 3 to be provided with selector switches so that it is also possible to exclude individual cells of the double-layer capacitor DLC from the charge equalization there.

The invention claimed is:

1. A device for charge equalizing series-connected individual cells of an energy accumulator, the device comprising:
   an energy accumulator including a plurality of individual cells connected in series, the energy accumulator having a connection;
   a DC/DC converter including an input and an output;
   a switch having a first switching state connecting said input of said DC/DC converter to the connection of the energy accumulator to remove energy from the energy accumulator, said switch having a second switching state connecting said input of said DC/DC converter to a further power source;
   a DC/AC converter connected to said output of said DC/DC converter, said DC/AC converter having an intermediate circuit capacitor and a bridge connection;
   AC buses disposed downstream of said DC/AC converter;
   a rectifier;
   coupling elements, a series connection of respective one of said coupling elements and said rectifier is disposed between each of the cells and a respective one of said AC buses; and
   selector switches, at least one of said selector switches disposed between said respective AC bus and each of the cells, the cells being electrically coupled to said respective AC bus or electrically disconnected from said respective AC bus through said selector switches.

2. The device according to claim 1, wherein:
   said rectifier has a plurality of diodes connected to said coupling elements being coupling capacitors; and
   a respective coupling capacitor of said coupling capacitors each connected to a first diode and second diode of said diodes, said first diode connected to said respective coupling capacitor so that said first diode ($D_{xa}$, $D_{xc}$, wherein x=1 to n) is conductive from a connection of said respective coupling capacitor facing away from said respective AC bus to a positive connection of a respective cell and said second diode is conductive from a negative connection of the respective cell to said connection of said respective coupling capacitor facing away from said respective AC bus.

3. The device according to claim 1, further comprising a further switch and said DC/DC converter may be connected to a further power source through said further switch.

4. The device according to claim 1, wherein said DC/DC converter is a current-regulated voltage reduction unit.

5. The device according to claim 1, wherein said bridge connection of said DC/AC converter includes a half-bridge with two series transistors connected parallel to said intermediate circuit capacitor.

6. The device according to claim 1, wherein said bridge connection of said DC/AC converter has a configuration with multi-phases, each of said phases is a half-bridge having two series transistors connected parallel to said intermediate circuit capacitor.

7. The device according to claim 1, wherein the energy accumulator is a double-layer capacitor.

8. The device according to claim 1, wherein the energy accumulator contains a series connection of accumulators.

9. The device according to claim 5, wherein said bridge connection of said DC/AC converter is self-clocked.

10. The device according to claim 6, wherein said bridge connection of said DC/AC converter is self-clocked.

11. The device according to claim 1, further comprising a common housing, the energy accumulator, said rectifier, said coupling elements and said AC buses are integrated in said common housing.

12. A method for operating a device for charge equalizing series-connected individual cells of an energy accumulator, the device including an energy accumulator including a plurality of individual cells connected in series, the energy accumulator having a connection, a DC/DC converter including an input and an output, a switch having a switching state connecting the input of the DC/DC converter to the connection of the energy accumulator to remove energy from the energy accumulator and a second switching state connecting the input of the DC/DC converter to a further power source, a DC/AC converter connected to the output of the DC/DC converter, the DC/AC converter having an intermediate circuit capacitor and a bridge connection, AC buses disposed downstream of the DC/AC converter, a rectifier, coupling elements, a series connection of a respective one of the coupling elements and the rectifier is disposed between each of the cells and a respective one of the AC buses, and selector switches, at least one of the selector switches is disposed between the respective AC bus and each of the cells, the cells being electrically coupled to the respective AC bus or electrically disconnected from the respective AC bus by the selector switches, the method which comprises the steps of:
   supplying the DC/DC converter from one of the energy accumulator and the further power source, the DC/DC converter supplying a current to the intermediate circuit capacitor resulting in a voltage being automatically established at the intermediate circuit capacitor for charging the cells;
   inverting the voltage in a DC/AC converter;
   supplying, from the DC/AC converter, an inverted, pulsating charging current via the AC buses, the coupling elements and diodes of the rectifier; and
   selecting at least one cell to be charged via at least one of the selector switches.

13. The method according to claim 12, which further comprises:
   providing the DC/AC converter as a multi-phase DC/AC converter providing a charging current for the cell with a lowest cell voltage flowing in a first phase from the intermediate circuit capacitor via a first transistor, a first AC bus, a first selector switch, a first coupling element and a first diode, through the cell and back via a second diode, a second coupling element, a second selector switch, a second AC bus and a fourth transistor to the intermediate circuit capacitor and a charging current flows in a second phase from the intermediate circuit capacitor via a third transistor, the second AC bus, the second selector switch, the second coupling element and a third diode, through the cell and back via a fourth diode, the first coupling element, the first selector switch, the first AC bus and a second transistor to the intermediate circuit capacitor.

* * * * *